US010601559B2

United States Patent
Su

(10) Patent No.: US 10,601,559 B2
(45) Date of Patent: Mar. 24, 2020

(54) METHODS AND DEVICES FOR TRANSMITTING AND RECEIVING PILOT SIGNAL

(71) Applicant: CHINA ACADEMY OF TELECOMMUNICATIONS TECHNOLOGY, Beijing (CN)

(72) Inventor: Xin Su, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 102 days.

(21) Appl. No.: 15/547,475

(22) PCT Filed: Jan. 13, 2016

(86) PCT No.: PCT/CN2016/070780
§ 371 (c)(1),
(2) Date: Jul. 28, 2017

(87) PCT Pub. No.: WO2016/119596
PCT Pub. Date: Aug. 4, 2016

(65) Prior Publication Data
US 2018/0006784 A1    Jan. 4, 2018

(30) Foreign Application Priority Data
Jan. 29, 2015 (CN) .......................... 2015 1 0047852

(51) Int. Cl.
*H04L 5/00*    (2006.01)
*H04B 7/26*    (2006.01)
(Continued)

(52) U.S. Cl.
CPC ......... *H04L 5/0048* (2013.01); *H04B 7/0617* (2013.01); *H04B 7/0695* (2013.01); *H04B 7/26* (2013.01); *H04L 1/00* (2013.01)

(58) Field of Classification Search
CPC combination set(s) only.
See application file for complete search history.

(56) References Cited

U.S. PATENT DOCUMENTS 6,337,659 B1   1/2002  Kim
6,337,689 B1   1/2002  Hochmuth et al.
(Continued)

FOREIGN PATENT DOCUMENTS

CN        1088947 C      8/2002
CN        102457318 A    5/2012
(Continued)

OTHER PUBLICATIONS

Written Opinion of the International Search Authority for PCT/CN2016/070780, dated Apr. 12, 2016, and its English translation provided by WIPO.
International Search Report for PCT/CN2016/070780, dated Apr. 13, 2016, and its English translation provided by WIPO.
(Continued)

*Primary Examiner* — Alpus Hsu
*Assistant Examiner* — Camquyen Thai
(74) *Attorney, Agent, or Firm* — Ladas & Parry, LLP

(57) ABSTRACT

The present disclosure provides methods and devices for transmitting and receiving a pilot signal, so as to reduce the number of antenna ports for transmitting the pilot signal and reduce pilot resource consumption. The method for transmitting the pilot signal includes: generating, by a base station, a pilot signal formed by a wide beam and a pilot signal formed by a plurality of narrow beams; and transmitting, by the base station, the pilot signals to a UE through at least one pre-configured first antenna port and at least one pre-configured second antenna port, the pilot signal formed by the wide beam being transmitted through the first antenna port, and the pilot signal formed by the plurality of narrow beams being transmitted through the second antenna port.

12 Claims, 5 Drawing Sheets receiving, by a UE, pilot signals from a base station, the pilot signals comprising a pilot signal formed by a wide beam and transmitted by the base station through first antenna ports and a pilot signal formed by a plurality of narrow beams and transmitted by the base station through second antenna ports ⟶ 602 measuring, by the UE, the received pilot signals to determine an optimal first antenna port and an optimal second antenna port ⟶ 604

(51) Int. Cl.
*H04L 1/00* (2006.01)
*H04B 7/06* (2006.01)

(56) References Cited

U.S. PATENT DOCUMENTS

| | | | |
|---|---|---|---|
| 6,415,163 B1 | 7/2002 | Keskitalo et al. | |
| 9,300,388 B1* | 3/2016 | Behroozi | H04B 7/18504 |
| 2013/0059619 A1 | 3/2013 | Kim et al. | |
| 2013/0156120 A1 | 6/2013 | Josiam et al. | |
| 2013/0210491 A1* | 8/2013 | Eriksson | H04W 16/24 |
| | | | 455/562.1 |
| 2013/0217404 A1* | 8/2013 | Jung | H04W 72/08 |
| | | | 455/452.1 |
| 2014/0192917 A1 | 7/2014 | Nam et al. | |
| 2014/0341048 A1 | 11/2014 | Sajadieh et al. | |
| 2015/0097744 A1* | 4/2015 | Ownbey | H01Q 1/246 |
| | | | 343/758 |
| 2015/0124688 A1* | 5/2015 | Xu | H04B 7/0452 |
| | | | 370/312 |
| 2015/0280875 A1 | 10/2015 | Jing et al. | |
| 2016/0173208 A1* | 6/2016 | Kuchi | H04W 72/085 |
| | | | 375/267 |
| 2016/0337056 A1* | 11/2016 | Frenne | H04B 7/0695 |

FOREIGN PATENT DOCUMENTS

| | | | | |
|---|---|---|---|---|
| CN | 103547341 A | 1/2014 | | |
| CN | 103687010 A | 3/2014 | | |
| CN | 103812546 A | 5/2014 | | |
| CN | 104040908 A | 9/2014 | | |
| WO | WO-2013032188 A2 * | 3/2013 | | H04W 72/046 |
| WO | 2014193070 A1 | 12/2014 | | |

OTHER PUBLICATIONS

Written Opinion of the International Search Authority for PCT/CN2016/070780, dated Apr. 13, 2016, and its English translation provided by Bing.Com Microsoft Translate.
Extended European Search Report dated Dec. 5, 2017 for European Patent Application No. 16742658.4.
Office Action dated Mar. 17, 2017 for Taiwanese Patent Application No. 105101478 and its English translation by Google Translate.
Office Action dated Oct. 31, 2017 for Taiwanese Patent Application No. 105101478 and its English translation by Google Translate.
International Preliminary Report on Patentability (Chapter I) for PCT/CN2016/070780 dated Aug. 1, 2017 and its English translation from WIPO.
China Telecom: "CSI-RS Desing and CSI Reporting for EB/FD-MIMO", 3GPP Draft: R1-144954, $3^{rd}$ Generation Partnership Project (3GPP), Mobile Cometence Centre; 650, Route Des Lucioles; F-06921 Sophia-Antipolis Cedex; France, vol. RAN WG1, No. San Francisco, USA; Nov. 17, 2014-Nov. 21, 2014, Nov. 17, 2014 (Nov. 17, 2014), XP050876005, Retrieved from the internet: URL:http://www.3gpp.org.ftp/Meetings_3GPP_SYNC/RAN1/Docs/ [retrieved on Nov. 17, 2014].

* cited by examiner

METHODS AND DEVICES FOR TRANSMITTING AND RECEIVING PILOT SIGNAL

CROSS-REFERENCE TO RELATED APPLICATIONS

The present application is the U.S. national phase of PCT Application No. PCT/CN2016/070780 filed on Jan. 13, 2016, which claims a priority to Chinese Patent Application No. 201510047852.0 filed on Jan. 29, 2015, which are incorporated herein by reference in their entireties.

TECHNICAL FIELD

The present disclosure relates to the field of communication technology, in particular to methods and devices for transmitting and receiving a pilot signal.

BACKGROUND

In a conventional Time Division Duplex (TDD)-based or Frequency Division Duplex (FDD)-based Multiple Input Multiple Output (MIMO) antenna system, there are a small amount of antennae for a base station, and a User Equipment (UE) may measure the entire MIMO channel matrix. A pilot signal for measuring Channel State Information (CSI) is called as a reference signal in a Long Term Evolution (LTE) system, and it may include, e.g., a Common Reference Signal (CRS) and a Channel State Information Reference Signal (CSI-RS) for a downlink. Usually, each antenna port is configured to transmit one pilot signal. For example, in a Long Term Evolution Advanced (LTE-A) system, the base station may support at least four CRS antenna ports and eight CSI-RS antenna ports, and one antenna port may occupy a set of time-domain or frequency-domain resources. These antenna ports are orthogonal to each other in the time domain, the frequency domain or the code domain, so the UE may measure the corresponding CS, e.g., the MIMO channel matrix. Then, the UE may determine, on the basis of the measured CSI, an optimal Rank Indicator (RI), an optimal Pre-coding Matrix Indicator (PMI) and an optimal Channel Quality Indicator (CQI), and report the CSI to the base station.

For the massive MIMO technique, the base station may be provided with a large-scale antenna array (consisting of hundreds or thousands of antennae), so as to improve a spatial resolution and increase a system capacity. In the case that the antennae are arranged in a two-dimensional, uniform, rectangular array, it is possible to provide a very high three-dimensional (both horizontal and vertical) resolution. However, the channels for the massive MIMO system are arranged in a high-dimensional matrix, and during the practical use of the massive MIMO system in the FDD system, there is a huge challenge for the base station to acquire the CSI. On one hand, it may take a considerable amount of resource consumption for the FDD system to feed back such a high-dimensional MIMO channel matrix coefficient that meets a certain accuracy requirement. In order to reduce the feedback overhead, academics have presented some methods for efficiently compressing and encoding the high-dimensional MIMO channel matrix, e.g., a compressive sensing method. However, it is merely able for the compressive sensing method to reduce the feedback overhead. On the other hand, in the case of measuring the complete MIMO channel matrix, a large amount of pilot antenna ports for measuring the CSI may be provided, resulting in a considerable amount of resource consumption for transmitting the pilot signals. In order to reduce the pilot resource consumption, one method is to reduce the size of the MIMO channel capable of being detected by the UE, i.e., to reduce the dimension of the MIMO channel matrix. The industry has proposed a scheme where a plurality of antennae is virtualized to correspond to one pilot antenna port, so as to reduce the pilot resource consumption. However, the MIMO antenna array currently used in the industry is still of a small scale.

Hence, with respect to the massive MIMO system, a scheme for transmitting the pilot signal in various beam directions is proposed, so as to facilitate the UE to select an optimal beam. In this way, instead of measuring the channel matrix through the pilot signal, a spatial beam direction where each UE is located may be measured. Each antenna port (i.e., beam pilot port) corresponds to one spatial beam direction, and pilot symbols from the antenna port may be beam-formed and pre-coded and then transmitted through all or parts of the antennae, so as to form a beam in a corresponding spatial direction. However, because it is able for the massive MIMO technique to provide a very high spatial resolution, there may exist a huge quantity of spatial beam directions. In the case that one antenna port is configured for each spatial beam direction, it is still necessary to consume a large amount of resources.

In a word, in the related schemes for transmitting the pilot signals in various beam directions, there is a huge quantity of spatial beam directions, and in the case that one antenna port is configured by the base station for each spatial beam direction to transmit the pilot signal, a large amount of resources may be occupied.

SUMMARY

An object of the present disclosure is to provide methods and devices for transmitting and receiving a pilot signal, so as to reduce the number of the antenna ports for transmitting the pilot signals, thereby reducing the pilot resource consumption.

In one aspect, the present disclosure provides in some embodiments a method for transmitting a pilot signal, including: generating, by a base station, a pilot signal formed by a wide beam and a pilot signal formed by a plurality of narrow beams; and transmitting, by the base station, the pilot signals to a User Equipment (UE) through at least one pre-configured first antenna port and at least one pre-configured second antenna port, the pilot signal formed by the wide beam being transmitted through the first antenna port, and the pilot signal formed by the plurality of narrow beams being transmitted through the second antenna port.

According to the method in the embodiments of the present disclosure, the base station may transmit the pilot signals through the at least one pre-configured first antenna port and the at least one pre-configured second antenna port, and the pilot signal transmitted through the second antenna port may be the pilot signal formed by the plurality of narrow beams, i.e., the base station may configure one antenna port for a plurality of spatial beam directions to transmit the pilot signal. As compared with the related art where the base station configures one antenna port for each spatial beam direction to transmit the pilot signal, it is able for one antenna port to transmit the pilot signal formed by the plurality of narrow beams in a plurality of beam directions. As a result, it is possible to reduce the number of the antenna ports for transmitting the pilot signals, thereby reducing the pilot resource consumption.

In a possible embodiment of the present disclosure, the pilot signal formed by the plurality of narrow beams includes a pilot signal formed by a resultant beam of a plurality of narrow beams, beam directions of the plurality of narrow beams are orthogonal to each other, or a pilot signal formed by a resultant beam of a plurality of narrow beams, beam directions of the plurality of narrow beams are at an angle above a first predetermined threshold to each other.

In a possible embodiment of the present disclosure, the wide beam and the narrow beams meet a condition that the wide beam covers the narrow beams having beam directions that are at an angle below a second predetermined threshold to each other and each of the plurality of narrow beams is covered by at least one wide beam.

In a possible embodiment of the present disclosure, the pilot signal formed by the wide beam is a pilot signal formed by a resultant beam of a plurality of wide beams, and the pilot signals formed by the narrow beams covered by different wide beams of the plurality of wide beams are transmitted through different second antenna ports.

According to the method in the embodiments of the present disclosure, the pilot signal formed by the wide beam is the pilot signal formed by the resultant beam of the plurality of wide beams, and as compared with the situation where the pilot signal formed by each wide beam is transmitted through one of the first antenna ports, it is possible to further reduce the number of the first antenna ports, thereby reducing the pilot resource consumption.

In a possible embodiment of the present disclosure, subsequent to the step of transmitting, by the base station, the pilot signals to the UE through the at least one pre-configured first antenna port and the at least one pre-configured second antenna port, the method further includes: receiving, by the base station, an identifier of an optimal first antenna port and an identifier of an optimal second antenna port from the UE, the optimal first antenna port being a first antenna port corresponding to a pilot signal with a best signal quality among the pilot signals received by the UE from the at least one first antenna port, the optimal second antenna port being a second antenna port corresponding to a pilot signal with a best signal quality among the pilot signals received by the UE from the at least one second antenna port; and determining, by the base station, an identifier of an optimal narrow beam corresponding to the UE based on the identifier of the optimal first antenna port, the identifier of the optimal second antenna port and the condition met by the wide beam and the narrow beams.

In a possible embodiment of the present disclosure, the step of determining, by the base station, the identifier of the optimal narrow beam corresponding to the UE based on the identifier of the optimal first antenna port, the identifier of the optimal second antenna port and the condition met by the wide beam and the narrow beams includes: determining, by the base station, a wide beam set used for forming the pilot signal transmitted by the optimal first antenna port based on the identifier of the optimal first antenna port and a first narrow beams set used for forming the pilot signal transmitted by the optimal second antenna port based on the identifier of the optimal second antenna port; determining, by the base station, the narrow beam covered by each wide beam in the wide beam set based on the condition met by the wide beam and the narrow beams, and forming a second narrow beam set by using the narrow beams covered by the wide beams in the wide beam set; and determining, by the base station, the narrow beam shared by the first narrow beam set and the second narrow beam set, and using the identifier of the shared narrow beam as the identifier of the optimal narrow beam corresponding to the UE.

In a possible embodiment of the present disclosure, subsequent to the step of transmitting, by the base station, pilot signals to the UE through the at least one first antenna port and the at least one second antenna port, the method further includes: transmitting, by the base station, the condition met by the wide beam and the narrow beams to the UE; receiving, by the base station, the identifier of the optimal narrow beam determined by the UE based on the condition met by the wide beam and the narrow beams from the UE; and using, by the base station, the identifier of the optimal narrow beam as the identifier of the optimal narrow beam corresponding to the UE.

In a possible embodiment of the present disclosure, the method further includes: receiving, by the base station, a CQI from the UE; and using, by the base station, the CQI as a CQI for the optimal narrow beam corresponding to the UE.

In another aspect, the present disclosure provides in some embodiments a method for receiving a pilot signal, including: receiving, by a User Equipment (UE), pilot signals from a base station, the pilot signals including a pilot signal formed by a wide beam and transmitted by the base station through first antenna ports and a pilot signal formed by a plurality of narrow beams and transmitted by the base station through second antenna ports; and measuring, by the UE, the received pilot signals to determine an optimal first antenna port and an optimal second antenna port.

According to the method in the embodiments of the present disclosure, the UE may measure the pilot signals transmitted by the base station through the first antenna port and the second antenna port, and determine the optimal first antenna port and the optimal second antenna port. The pilot signal transmitted by the base station through the second antenna port may be the pilot signal formed by the plurality of narrow beams, i.e., the base station may configure one antenna port for a plurality of spatial beam directions to transmit the pilot signal. As compared with the related art where the base station configures one antenna port for each spatial beam direction to transmit the pilot signal, the pilot signals received by the UE from the base station through the second antenna port may include the pilot signal in various spatial beam directions. As a result, it is possible to reduce the number of the pilot signals received by the UE, thereby reducing the resource consumption for processing the pilot signals by the UE.

In a possible embodiment of the present disclosure, the optimal first antenna port is a first antenna port corresponding to the pilot signal with a best signal quality among the pilot signals transmitted through the first antenna ports, and the optimal second antenna port is a second antenna port corresponding to the pilot signal with a best signal quality among the pilot signals transmitted through the second antenna ports.

In a possible embodiment of the present disclosure, the method further includes: determining, by the UE, an identifier of the optimal first antenna port and an identifier of the optimal second antenna port based on the optimal first antenna port and the optimal second antenna port; and transmitting, by the UE, the identifier of the optimal first antenna port and the identifier of the optimal second antenna port to the base station.

In a possible embodiment of the present disclosure, the method further includes: determining, by the UE, an identifier of the optimal first antenna port and an identifier of the optimal second antenna port based on the optimal first antenna port and the optimal second antenna port; determining, by the UE, an identifier of an optimal narrow beam corresponding to the UE based on the identifier of the optimal first antenna port, the identifier of the optimal second antenna port and a condition met by the wide beam and the narrow beams, the condition met by the wide beam and the narrow beams including that the wide beam covers narrow beams having beam directions that are at an angle below a second predetermined threshold to each other and each of the plurality of narrow beams is covered by at least one wide beam; and transmitting, by the UE, the identifier of the optimal narrow beam to the base station.

In a possible embodiment of the present disclosure, the step of determining, by the UE, the identifier of the optimal narrow beam corresponding to the UE based on the identifier of the optimal first antenna port, the identifier of the optimal second antenna port and the condition met by the wide beam and the narrows beam includes: determining, by the UE, a wide beam set used for forming the pilot signal transmitted through the optimal first antenna port based on the identifier of the optimal first antenna port and a first narrow beam set used for forming the pilot signal transmitted through the optimal second antenna port based on the identifier of the optimal second antenna port; determining, by the UE, the narrow beam covered by each wide beam in the wide beam set based on the condition met by the wide beam and the narrow beams, and forming a second narrow beam set by using the narrow beams covered by the wide beams in the wide beam set; and determining, by the UE, the narrow beam shared the first narrow beam set and the second narrow beam set, and using an identifier of the shared narrow beam as the identifier of the optimal narrow beam corresponding to the UE.

In a possible embodiment of the present disclosure, the condition met by the wide beam and the narrow beams is pre-stored in the UE, or the condition met by the wide beam and the narrow beams is received by the UE from the base station and then stored in the UE.

In a possible embodiment of the present disclosure, the method further includes calculating, by the UE, a CQI of the pilot signal corresponding to the optimal second antenna port, and returning the CQI, as a CQI for the optimal narrow beam corresponding to the UE, to the base station.

In yet another aspect, the present disclosure provides in some embodiments a device for transmitting a pilot signal, including: a processing unit configured to generate a pilot signal formed by a wide beam and a pilot signal formed by a plurality of narrow beams; and a transmission unit connected to the processing unit and configured to transmit the pilot signals to a UE through at least one pre-configured first antenna port and at least one pre-configured second antenna port, the pilot signal formed by the wide beam being transmitted through the first antenna port, and the pilot signal formed by the plurality of narrow beams being transmitted through the second antenna port.

According to the device in the embodiments of the present disclosure, the device may transmit the pilot signals through the at least one pre-configured first antenna port and the at least one pre-configured second antenna port, and the pilot signal transmitted through the second antenna port may be the pilot signal formed by the plurality of narrow beams, i.e., the device may configure one antenna port for a plurality of spatial beam directions to transmit the pilot signal. As compared with the related art where the base station configures one antenna port for each spatial beam direction to transmit the pilot signal, it is able for one antenna port to transmit the pilot signal formed by the plurality of narrow beams in a plurality of beam directions. As a result, it is possible to reduce the number of the antenna ports for transmitting the pilot signals, thereby reducing the pilot resource consumption.

In a possible embodiment of the present disclosure, the wide beam and the narrow beams meet a condition that the wide beam covers the narrow beams having beam directions that are at an angle below a second predetermined threshold to each other and each of the plurality of narrow beams is covered by at least one wide beam.

In a possible embodiment of the present disclosure, the pilot signal formed by the wide beam is a pilot signal formed by a resultant beam of a plurality of wide beams, and the pilot signals formed by the narrow beams covered by different wide beams of the plurality of wide beams are transmitted through different second antenna ports.

According to the device in the embodiments of the present disclosure, the pilot signal formed by the wide beam is the pilot signal formed by the beam consisting of the plurality of wide beams, and as compared with the situation where the pilot signal formed by each wide beam is transmitted through one of the first antenna ports, it is possible to further reduce the number of the first antenna ports, thereby reducing the pilot resource consumption.

In a possible embodiment of the present disclosure, the device further includes: a first reception unit connected to the processing unit and configured to receive an identifier of an optimal first antenna port and an identifier of an optimal second antenna port from the UE after the transmission unit transmits the pilot signals to the UE through the at least one pre-configured first antenna port and the at least one pre-configured second antenna port, the optimal first antenna port being a first antenna port corresponding to a pilot signal with a best signal quality among the pilot signals received by the UE from all the first antenna ports, the optimal second antenna port being a second antenna port corresponding to a pilot signal with a best signal quality among the pilot signals received by the UE from all the second antenna ports. The processing unit is further configured to determine an identifier of an optimal narrow beam corresponding to the UE based on the identifier of the optimal first antenna port, the identifier of the optimal second antenna port and the condition met by the wide beam and the narrow beams.

In a possible embodiment of the present disclosure, the processing unit is further configured to: determine a wide beam set used for forming the pilot signal transmitted by the optimal first antenna port based on the identifier of the optimal first antenna port and a first narrow beam set used for forming the pilot signal transmitted by the optimal second antenna port based on the identifier of the optimal second antenna port; determine the narrow beam covered by each wide beam in the wide beam set based on the condition met by the wide beam and the narrow beams, and form a second narrow beam set by using the narrow beams covered by the wide beams in the wide beam set; and determine the narrow beam shared by the first narrow beam set and the second narrow beam set, and use the identifier of the shared narrow beam as the identifier of the optimal narrow beam corresponding to the UE.

In a possible embodiment of the present disclosure, the transmission unit is further configured to transmit the condition met by the wide beam and the narrow beam to the UE. The device further includes a second reception unit connected to the processing unit and configured to, after the transmission unit transmits the pilot signals to the UE through the at least one first antenna port and the at least one second antenna port, receive the identifier of the optimal narrow beam determined by the UE based on the condition met by the wide beam and the narrow beams from the UE. The processing unit is further configured to use the identifier of the optimal narrow beam as the identifier of the optimal narrow beam corresponding to the UE.

In a possible embodiment of the present disclosure, the device further includes a third reception unit connected to the processing unit and configured to receive a CQI from the UE. The processing unit is further configured to use the CQI as a CQI for the optimal narrow beam corresponding to the UE.

In still yet another aspect, the present disclosure provides in some embodiments a device for receiving a pilot signal, including: a reception unit configured to receive pilot signals from a base station, the pilot signals including a pilot signal formed by a wide beam and transmitted by the base station through first antenna ports and a pilot signal formed by a plurality of narrow beams and transmitted by the base station through second antenna ports; and a processing unit connected to the reception unit and configured to measure the received pilot signals to determine an optimal first antenna port and an optimal second antenna port.

According to the device in the embodiments of the present disclosure, the device may measure the pilot signals transmitted by the base station through the first antenna port and the second antenna port, and determine the optimal first antenna port and the optimal second antenna port. The pilot signal transmitted by the base station through the second antenna port may be the pilot signal formed by the plurality of narrow beams, i.e., the base station may configure one antenna port for a plurality of spatial beam directions to transmit the pilot signal. As compared with the related art where the base station configures one antenna port for each spatial beam direction to transmit the pilot signal, the pilot signals received by the device from the base station through the second antenna port may include the pilot signal in various spatial beam directions. As a result, it is possible to reduce the number of the pilot signals received by the UE, thereby reducing the resource consumption for processing the pilot signals by the UE.

In a possible embodiment of the present disclosure, the processing unit is further configured to determine an identifier of the optimal first antenna port and an identifier of the optimal second antenna port based on the optimal first antenna port and the optimal second antenna port. The device further includes a first transmission unit connected to the processing unit and configured to transmit the identifier of the optimal first antenna port and the identifier of the optimal second antenna port to the base station.

In a possible embodiment of the present disclosure, the processing unit is further configured to: determine an identifier of the optimal first antenna port and an identifier of the optimal second antenna port based on the optimal first antenna port and the optimal second antenna port; and determine an identifier of an optimal narrow beam corresponding to the UE based on the identifier of the optimal first antenna port, the identifier of the optimal second antenna port and a condition met by the wide beam and the narrow beams, the condition met by the wide beam and the narrow beams including that the wide beam covers narrow beams having beam directions that are at an angle below a second predetermined threshold to each other and each of the plurality of narrow beams is covered by at least one wide beam. The device further includes a second transmission unit connected to the processing unit and configured to transmit the identifier of the optimal narrow beam to the base station.

In a possible embodiment of the present disclosure, the processing unit is further configured to: determine a wide beam set used for forming the pilot signal transmitted through the optimal first antenna port based on the identifier of the optimal first antenna port and a first narrow beam set used for forming the pilot signal transmitted through the optimal second antenna port based on the identifier of the optimal second antenna port; determine the narrow beam covered by each wide beam in the wide beam set based on the condition met by the wide beam and the narrow beams, and form a second narrow beam set by using the narrow beams covered by the wide beams in the wide beam set; and determine the narrow beam shared by the first narrow beam set and the second narrow beam set, and use an identifier of the shared narrow beam as the identifier of the optimal narrow beam corresponding to the UE.

In a possible embodiment of the present disclosure, the processing unit is further configured to calculate a CQI of the pilot signal corresponding to the optimal second antenna port, and return the CQI, as a CQI for the optimal narrow beam corresponding to the UE, to the base station.

DETAILED DESCRIPTION OF THE EMBODIMENTS

The embodiments of the methods and devices for transmitting and receiving a pilot signal provided by the present disclosure will be described hereinafter in conjunction with the drawings and embodiments.

Apparently, narrow beams mentioned in the embodiments of the present disclosure refer to beams in various beam directions formed by all the antennae, with different weighting coefficients. In addition, wide beams mentioned in the embodiments of the present disclosure refer to beams in various beam directions formed by parts of or all the antennae, also with different weighting coefficients.

Figure 1:
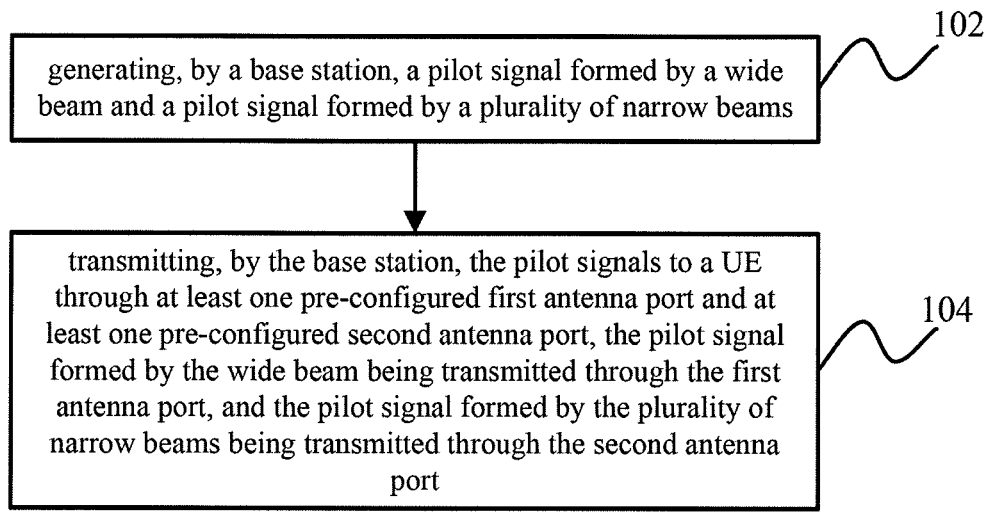
FIG. 1 is a flow chart of a method for transmitting a pilot signal at a base station side according to embodiments of the present disclosure.

The present disclosure provides in some embodiments a method for transmitting a pilot signal at a base station side which, as shown in FIG. 1. The method includes:

Step 102 of generating, by a base station, a pilot signal formed by a wide beam and a pilot signal formed by a plurality of narrow beams; and Step 104 of transmitting, by the base station, the pilot signals to a UE through at least one pre-configured first antenna port and at least one pre-configured second antenna port, the pilot signal formed by the wide beam being transmitted through the first antenna port, and the pilot signal formed by the plurality of narrow beams being transmitted through the second antenna port.

According to the method in the embodiments of the present disclosure, the base station may transmit the pilot signals through the at least one pre-configured first antenna port and the at least one pre-configured second antenna port, and the pilot signal transmitted through the second antenna port may be the pilot signal formed by the plurality of narrow beams, i.e., the base station may configure one antenna port for a plurality of spatial beam directions to transmit the pilot signal. As compared with the related art where the base station configures one antenna port for each spatial beam direction to transmit the pilot signal, it is possible for one antenna port to transmit the pilot signal formed by the plurality of narrow beams in a plurality of beam directions. As a result, it is possible to reduce the number of the antenna ports for transmitting the pilot signals, thereby reducing the pilot resource consumption.

It should be appreciated that, the at least one first antenna port and the at least one second antenna port pre-configured by the base station may remain unchanged, or they may be re-configured by the base station based on a feedback from the UE. In a possible embodiment of the present disclosure, the initially configured at least one first antenna port and at least one second antenna port may each cover all beam directions (360°), and then the feedback from the UE within a certain time period (e.g., one year) may be analyzed. In the case that there is no feedback from the UE at one or several regions, i.e., no UE is located at the one or several regions, the at least one first antenna port and the at least one second antenna port may be re-configured in such a manner that the pilot signal is temporarily not transmitted in the beam direction corresponding to the region where no UE is located, so as to further reduce the pilot resource consumption.

During the implementation, taking a pilot progress as an example, if the pilot progress is configured with $A_W$ ($A_W \geq 1$) first antenna ports and $A_N$ ($A_N \geq 1$) second antenna ports, and the pilot signal transmitted through each second antenna port is a pilot signal formed by Q (Q>1) narrow beams. At this time, $A_N*Q$ narrow beams may be measured in the pilot progress using the pilot signals transmitted through the $A_W + A_N$ antenna ports, reducing the pilot resource consumption. It can be seen that, the larger the value of Q is, the more the pilot resource consumption is reduced. In addition, more and finer narrow beams may be supported by using a plurality of pilot progresses or in a TDD or FDD manner.

The design of the pilot signal transmitted through each antenna port will be described hereinafter with respect to one subcarrier by taking an orthogonal FDD system (e.g., an LTE system) as an example. In the following, a letter not in bold represents a scalar, a lowercase letter in bold represents a column vector, an uppercase letter in bold represents a matrix, a symbol "⊗" represents a Kronecker product, and superscripts "T" and "H" represent transpose and conjugate transpose of the matrix or vector respectively. The base station includes $N_T$ transmission antennae (e.g., antenna elements). In the case that an antenna array is a two-dimensional, uniform rectangular array including Nx antennae in an x-axis direction (a horizontal direction) and Ny antennae in a y-axis direction (a vertical direction), $N_T = Nx*Ny$. A set of the first antenna ports is represented by $\Omega_W$ including $A_W$ elements, and a set of the second antenna ports is represented by $\Omega_N$ including $A_N$ elements.

Figure 2:
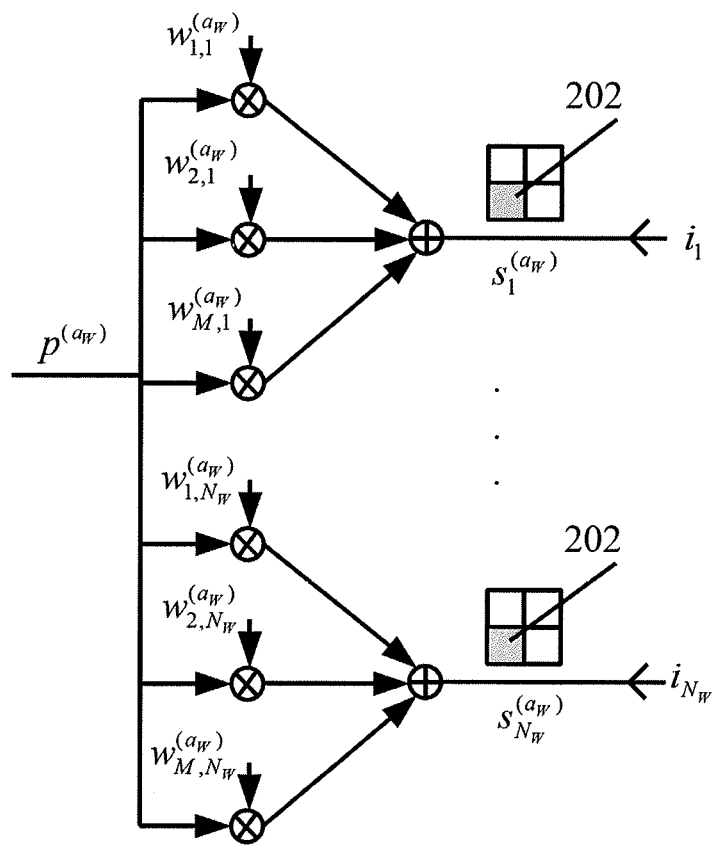
FIG. 2 is a schematic view showing the beam-forming principle at a first antenna port according to embodiments of the present disclosure.

Each first antenna port corresponds to a wide spatial beam, and a pilot symbol transmitted through the first antenna port is formed and pre-coded by the wide beam in the spatial beam direction and then transmitted by all the antennae or some selected antennae. FIG. 2 shows a situation where merely $N_W$ ($N_W \leq N_T$) transmission antennae of the base station take part in the course of beam-forming the pilot signal and antenna port mapping through the wide beams, and the $N_W$ transmission antennae are any $N_W$ transmission antennae of the $N_T$ antennae, i.e., $i_1, i_2, \ldots, i_{N_W} \in \{1, 2, \ldots, N_T\}$.

During the implementation, a wide beam pilot port $a_W$ ($a_W \in \Omega_W$) may occupy one or more time-domain or frequency-domain resources 202. For a pilot symbol $p^{(a_W)}$ to be transmitted on a certain time-domain or frequency-domain resource, the wide beam for forming the pilot symbol may be acquired by adding M (M≥1) wide beam vectors. In the case that M=1, it means that the pilot signal is formed by merely one wide beam. Each $N_W \times 1$-dimension wide beam vector may be pre-designed and denoted as $w_m^{(a_W)} = [w_{m,1}^{(a_W)}, w_{m,2}^{(a_W)}, \ldots, w_{m,N_W}^{(a_W)}]^T$ (m=1, 2, \ldots, M), so the resultant vector may be represented as $w^{(a_W)} = \sum_{m=1}^{M} w_m^{(a_W)}$. In the case that the antenna array is a two-dimensional, uniform rectangular array, the three-dimensional wide beam vector may be denoted as $w_m^{(a_W)} = w_{m,x}^{(a_W)} \otimes w_{m,y}^{(a_W)}$ (in the case that the transmission antennae are arranged sequentially in the y-axis direction) or $w_m^{(a_W)} = w_{m,y}^{(a_W)} \otimes w_{m,x}^{(a_W)}$ (in the case that the transmission antennae are arranged sequentially in the x-axis direction), where $w_{m,x}^{(a_W)}$ and $w_{m,y}^{(a_W)}$ represent an $N_{W_x} \times 1$-dimension wide beam vector in the x-axis direction and an $N_{W_y} \times 1$-dimension wide beam vector in the y-axis direction respectively, $N_{W_x}$ and $N_{W_y}$ represent the number of the antennae taking part in the formation of the wide beams in the x-axis direction and the y-axis direction respectively, and $N_W = N_{W_x} \times N_{W_y}$. Finally, the pilot signal formed by the wide beams and transmitted through the corresponding antenna may be an $N_W \times 1$-dimension vector, i.e., $s^{(a_W)} = w^{(a_W)} \times p^{(a_W)}$, where $s_1^{(a_W)} = (w_{1,1}^{(a_W)} + w_{2,1}^{(a_W)} + \ldots + w_{M,1}^{(a_W)}) \times p^{(a_W)}$, and $s_{N_W}^{(a_W)} = (w_{1,N_W}^{(a_W)} + w_{2,N_W}^{(a_W)} + \ldots + w_{M,N_W}^{(a_W)}) \times p^{(a_W)}$. The wide beam may be designed in any know ways. For example, a beam vector at a certain angle, e.g., a Discrete Fourier Transform (DFT) vector, may be formed using a small amount of transmission antennae, or a resultant beam vector may be formed by a plurality of narrow beams covered by the wide beam.

Figure 3:
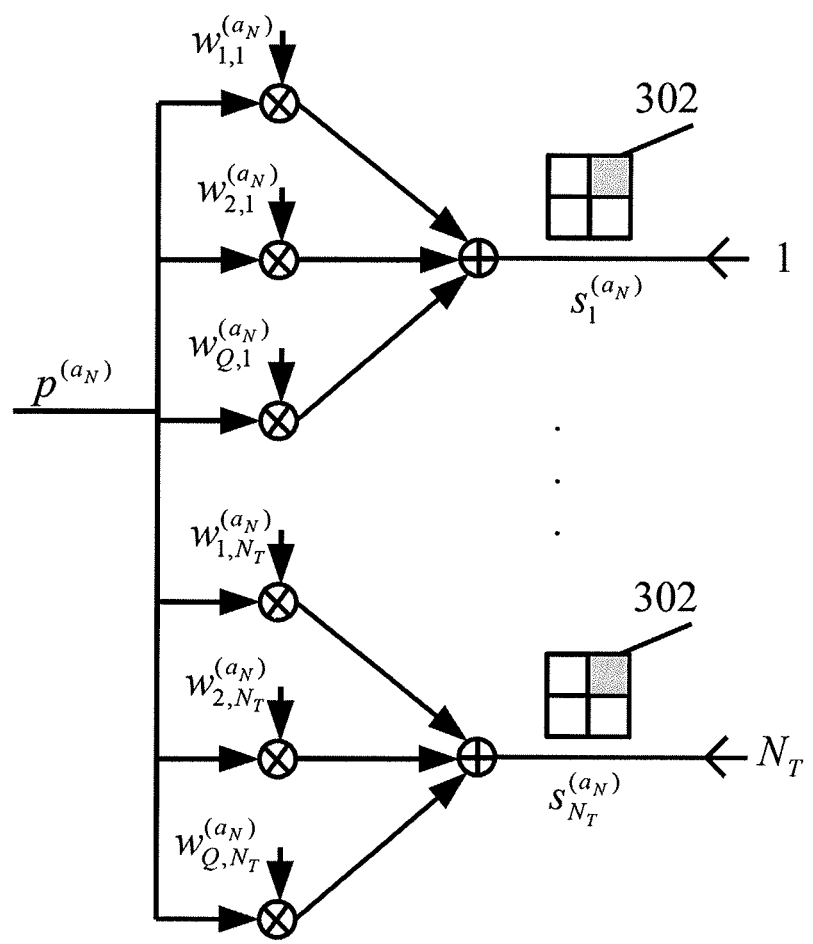
FIG. 3 is a schematic view showing the beam-forming principle at a second antenna port according to embodiments of the present disclosure.

FIG. 3 shows a situation where all the transmission antennae of the base station take part in the course of beam-forming the pilot signal transmitted through the second antenna port and the antenna port mapping through the resultant beam of the narrow beams. Similarly, each second antenna port $a_N$ ($a_N \in \Omega_N$) may occupy one or more time-domain or frequency-domain resources 302, and a pilot symbol $p^{(a_N)}$ may be transmitted on a certain time-domain or frequency-domain resource. The second antenna port corresponds to Q narrow beams, and a $q^{th}$ $N_T \times 1$-dimension narrow beam vector is represented as $w_q^{(a_N)}=[w_{q,1}^{(a_N)}, w_{q,2}^{(a_N)}, \ldots, w_{q,N_T}^{(a_N)}]^T$, so a resultant narrow beam vector may be represented as $w^{(a_N)}=\sum_{q=1}^{Q} w_q^{(a_N)}$. In the case that the antenna array is a two-dimensional, uniform rectangular array, the three-dimensional narrow beam vector may be denoted as $w_q^{(a_N)}=w_{q,x}^{(a_N)} \otimes w_{q,y}^{(a_N)}$ in the case that the transmission antennae are arranged sequentially in the y-axis direction) or $w_q^{(a_N)}=w_{q,y}^{(a_N)} \otimes w_{q,x}^{(a_N)}$ (in the case that the transmission antennae are arranged sequentially in the x-axis direction), where $w_{q,x}^{(a_N)}$ and $w_{q,y}^{(a_N)}$ represent an $N_x \times 1$-dimension narrow beam vector in the x-axis direction and an $N_x \times 1$-dimension narrow beam vector in the y-axis direction. Finally, the pilot signal formed by the combined narrow beams and transmitted through the corresponding antenna may be $N_W \times 1$-dimension vector, i.e. $s^{(a_N)}=w^{(a_N)} \times p^{(a_N)}$, where $s_1^{(a_N)}=(w_{1,1}^{(a_N)}+w_{2,1}^{(a_N)}+ \ldots +w_{Q,1}^{(a_N)}) \times p^{(a_N)}$ and $s_{N_W}^{(a_N)}=(w_{1,N_T}^{(a_N)}+w_{2,N_T}^{(a_N)}+ \ldots +w_{Q,N_T}^{(a_N)}) \times p^{(a_N)}$.

In a possible embodiment of the present disclosure, the pilot signal formed by the plurality of narrow beams includes a pilot signal formed by a resultant beam of a plurality of narrow beams having beam directions that are orthogonal to each other, or a pilot signal formed by a resultant beam of a plurality of narrow beams having beam directions that at an angle above a first predetermined threshold to each other.

It should be appreciated that, the plurality of combined beams for forming the pilot signals transmitted through the second antenna ports does not overlap each other, so as to ensure that the narrow beam in each beam direction may merely take part in beam-forming the pilot signal transmitted through one of the second antenna ports. During the implementation, the pilot signal is formed by the resultant beam of the narrow beams having beam directions that are at an angle above the first predetermined threshold to each other. The first predetermined threshold may be set based on the number of the narrow beams for forming the resultant beam. For example, in the case that the resultant beam of four narrow beams having beam directions are at an angel above the first predetermined threshold to each other, the first predetermined threshold may be 30°.

In a possible embodiment of the present disclosure, the wide beam and the narrow beams meet a condition that the wide beam covers the narrow beams having beam direction that are at an angle below a second predetermined threshold to each other and each narrow beam is covered by at least one wide beam.

Figure 4:
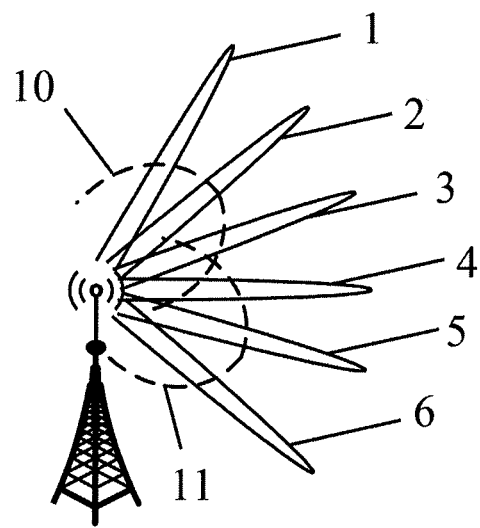
FIG. 4 is a schematic view showing a beam direction of a wide beam and a beam direction of a narrow beam according to embodiments of the present disclosure.

During the implementation, the wide beam may cover adjacent narrow beams having beam directions that are at an angle below the second predetermined threshold to each other. As shown in FIG. 4, a wide beam 10 with the best signal quality may cover a narrow beam 1, a narrow beam 2 and a narrow beam 3, and a wide beam 11 with the best signal quality may cover a narrow beam 4, a narrow beam 5 and a narrow beam 6. The second predetermined threshold may be set by default, e.g., 10°, or set based on the practical need, e.g., 5°. Each narrow beam may be covered by at least one wide beam, but at least one wide beam each covering the narrow beams may have different signal quality, i.e., each narrow beam may merely be covered by an optimal wide beam.

In a possible embodiment of the present disclosure, subsequent to the step of transmitting, by the base station, the pilot signals to the UE through the at least one pre-configured first antenna port and the at least one pre-configured second antenna port, the method further includes: receiving, by the base station, an identifier of an optimal first antenna port and an identifier of an optimal second antenna port from the UE, the optimal first antenna port being a first antenna port corresponding to a pilot signal with the best signal quality among the pilot signals received by the UE from all the first antenna ports, the optimal second antenna port being a second antenna port corresponding to a pilot signal with the best signal quality among the pilot signals received by the UE from all the second antenna ports; and determining, by the base station, an identifier of an optimal narrow beam corresponding to the UE based on the identifier of the optimal first antenna port, the identifier of the optimal second antenna port and the condition met by the wide beam and the narrow beams.

During the implementation, in the case that the number of reception antennae of the UE is $N_R$ and a channel approximately remains unchanged within a measurement period of the antenna port, a channel matrix H on a subcarrier from the base station to a certain UE may be an $N_R * N_T$ matrix. The identifier of the first antenna port and the identifier of the second antenna port are each agreed by the base station and the UE based on an identical criterion, i.e., the base station and the UE have already known the identifier of the first antenna port, the identifier of the second antenna port, and the time-domain and frequency-domain resources corresponding to each antenna port. The UE needs to measure the pilot signals from all the antenna ports and then acquire, through calculation (e.g., received power averaging), measurement results of all the beams on a part of the bandwidth (e.g., a sub-bandwidth of the LTE system) or the entire bandwidth (e.g., the entire bandwidth of the LTE system). Then, the UE needs to select, from all the first antenna ports for transmitting the pilot signals, the first antenna port with the best pilot signal quality as the optimal first antenna port, and select, from all the second antenna ports for transmitting the pilot signals, the second antenna port with the best pilot signal quality as the optimal second antenna port. The pilot signal with the best signal quality may be determined by comparing parameters of the pilot signals, such as pilot signal received power, and channel capacity estimated on the basis of the pilot signal.

In a possible embodiment of the present disclosure, in the case that $\hat{r}^{(a_W)}$ and $\hat{r}^{(a_N)}$ represent measurement signals acquired by the first antenna port $a_W$ and the second antenna port $a_N$ through processing respectively, the selected ports may be represented as $$a'_W = \underset{a_W \in \Omega_W}{\mathrm{argmax}} f(\hat{r}^{(a_W)}) \text{ and}$$

$$a'_N = \underset{a_N \in \Omega_N}{\mathrm{argmax}} f(\hat{r}^{(a_N)})$$

respectively, where the function argmax determines a value of $a_W$ at which $f(\cdot)$ has a maximum value, and $f(\cdot)$ represents a function for calculating a parameter of the pilot signal quality, e.g., a norm operation for calculating the pilot signal received power, or $f(\hat{r})=\|\hat{r}\|^2$.

After determining the optimal first antenna port and the optimal second antenna port, the UE may further determine an identifier of the optimal first antenna port and an identifier of the optimal second antenna port and transmit the identifier of the optimal first antenna port and the identifier of the optimal second antenna port to the base station. Because the pilot signal transmitted through the first antenna port is a pilot signal formed by the wide beam, the pilot signal transmitted through the second antenna port is a pilot signal formed by a plurality of narrow beams, and the wide beam and the narrow beams meet a certain condition (i.e., there is a fixed coverage relationship between the wide beam and the narrow beams), the base station may determine an identifier of an optimal narrow beam corresponding to the UE based on the identifier of the optimal first antenna port, the identifier of the optimal second antenna port and the condition met by the wide beam and the narrow beams.

In a possible embodiment of the present disclosure, the step of determining, by the base station, the identifier of the optimal narrow beam corresponding to the UE based on the identifier of the optimal first antenna port, the identifier of the optimal second antenna port and the condition met by the wide beam and the narrow beams includes: determining, by the base station, a wide beam set used for forming the pilot signal transmitted by the optimal first antenna port based on the identifier of the optimal first antenna port and a first narrow beam set used for forming the pilot signal transmitted by the optimal second antenna port based on the identifier of the optimal second antenna port; determining, by the base station, the narrow beam covered by each wide beam in the wide beam set based on the condition met by the wide beam and the narrow beams, and forming a second narrow beam set by using the narrow beams covered by the wide beams in the wide beam set; and determining, by the base station, the narrow beam shared by the first narrow beam set and the second narrow beam set, and using the identifier of the shared narrow beam as the identifier of the optimal narrow beam corresponding to the UE.

During the implementation, in the case of determining the narrow beam covered by each wide beam in the wide beam set based on the condition met by the wide beam and the narrow beams and forming the second narrow beam set by using the narrow beams covered by the wide beams in the wide beam set, the base station may add the coverage relationship between the wide beam and the narrow beams into a pre-stored mapping table based on the condition met by the wide beam and the narrow beams. To be specific, the base station may determine an optimal wide beam in at least one wide beam covering each narrow beam, and add a correspondence between an identifier of each narrow beam and an identifier of the optimal wide beam covering the narrow beam into the pre-stored mapping table. The identifiers of the wide beams and the narrow beams may be used for differentiate the beams in various beam directions, e.g., the identifiers may be serial numbers. Certainly, in some other embodiments of the present disclosure, the second narrow beam set covered by the wide beams corresponding to the identifier of the wide beam may be determined in any other ways, which will not be particularly defined herein. For example, the base station may determine the wide beam set for forming the pilot signal transmitted through the optimal first antenna port based on the identifier of the optimal first antenna port, and then directly determine the second narrow beam set covered by each wide beam in the wide beam set, without any necessary to determine the narrow beams covered by the other wide beams.

The procedure of determining the identifier of the optimal narrow beam corresponding to the UE based on the identifier of the optimal first antenna port, the identifier of the optimal second antenna port and the condition met by the wide beam and the narrow beams will be described hereinafter by taking the mapping table as an example.

In the case that a DFT codebook is adopted by the vectors beam-formed and pre-coded through N transmission antennae and the number of the code words (the beam-forming vectors) is K (i.e., there are K beam directions), an $n^{th}$ element of a $k^{th}$ beam-forming vector may be represented as $$w_{k,n} = \frac{1}{\sqrt{N}} \exp\left\{-j\frac{2\pi}{K}(k-1)(n-1)\right\},$$

where k has a value within the range of [1,K], and n has a value within the range of [1,N].

For example, the base station may include 32 transmission antennae ($N_T$=32) which are merely arranged linearly in the horizontal direction, and a pitch between the adjacent antennae is half of a wavelength. The narrow beam may be formed by all the transmission antennae, and an oversampling 64-DFT codebook may be adopted, i.e., K=64 and N=$N_T$=32. The wide beam may be formed by four adjacent transmission antennae and a 4-DFT codebook may be adopted, i.e., K=4 and N=$N_W$=4.

Figure 5:
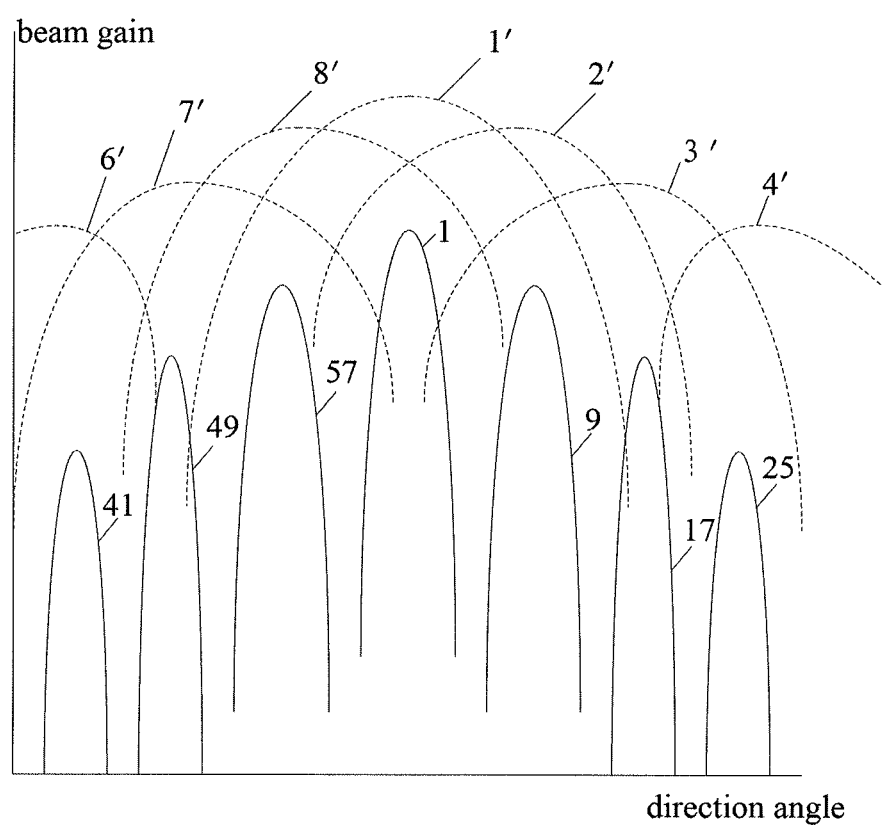
FIG. 5 is a schematic view showing the principle of determining an identifier of an optimal narrow beam according to embodiments of the present disclosure.

In a possible embodiment of the present disclosure, as shown in FIG. 5 (where a horizontal axis represents a direction angle between different beam directions and a vertical axis represents a beam gain in each beam direction), in the case that the number of the second antenna ports is 16 ($A_N$=16), each narrow beam pilot port may include 4 (i.e., Q=4) narrow beams having beam directions that are orthogonal to each other. In the case that the pilot signal transmitted through one first antenna port is merely formed by one wide beam, the number of the first antenna ports is 8 (i.e., $A_W$=8). In this regard, merely 24 (i.e., $A_N+A_W$=24) antenna ports may be used to measure 64 (i.e., $A_N*Q$=64) narrow beams.

FIG. 5 shows the directions of parts of the beams. Each transmission antenna is a sectorial, directional antenna, and a direction gain is G=−min {12(φ/65°)$^2$,30} dB, where φ represents the degree of an angle. For example, a first resultant beam of narrow beams 1, 17, 33, 49 (a major lobe of the narrow beam 33 is not shown) may be used for forming the pilot signal transmitted through one of the second antenna ports, and a second resultant beam of narrow beams 9, 25, 41, 57 may be used for forming the pilot signal transmitted through another one of the second antenna ports. In FIG. 5, each dotted line represents a shape of the wide beam, e.g., wide beams 1', 2', 3', 4', 6', 7' and 8' (a major lobe of a wide beam 5' is not shown). Table 1 is a mapping table between the wide beam and the narrow beams. As shown in Table 1, for the first resultant beam, the wide beam 1' covers the narrow beam 1, the wide beam 3' covers the narrow beam 17, the wide beam 5' covers the narrow beam 33, and the wide beam 7' covers the narrow beam 49; for the second resultant beam, the wide beam 2' covers the narrow beam 9, the wide beam 4' covers the narrow beam 25, the wide beam 6' covers the narrow beam 41, and the wide beam 8' cover the narrow beam 57. In the case that the pilot signal transmitted through the first antenna port corresponding to the identifier of the optimal first antenna port is formed by the wide beam 3' and the pilot signal transmitted through the second antenna port corresponding to the identifier of the optimal second antenna port is formed by the first resultant beam consisting of the narrow beams 1, 17, 33, 49, the base station may determine that the identifier of the optimal narrow beam corresponding to the UE is 17.

TABLE 1

| | wide beam number | | | | | | | |
|---|---|---|---|---|---|---|---|---|
| | 1' | 2' | 3' | 4' | 5' | 6' | 7' | 8' |
| narrow beam number | 1 | 9 | 17 | 25 | 33 | 41 | 49 | 57 |

It should be appreciated that, the more the wide beams are, the more accurate the identifier of the optimal narrow beam is. In addition, the pilot signal transmitted through one first antenna port may be formed by each wide beam or a resultant beam of a plurality of wide beams.

In a possible embodiment of the present disclosure, the pilot signal formed by the wide beam is a pilot signal formed by a resultant beam of a plurality of wide beams, and the pilot signals formed by the narrow beams covered by different wide beams of the plurality of wide beams are transmitted through different second antenna ports.

During the implementation, for example, M=2, i.e., the pilot signal transmitted through one first antenna port is formed by the resultant wide beam of two wide beams. The pilot signal transmitted through a first one of the first antenna ports may be formed by the wide beams 1' and 2', the pilot signal transmitted through a second one of the first antenna ports may be formed by the wide beams 3' and 4', the pilot signal transmitted through a third one of the first antenna ports may be formed by the wide beams 5' and 6', and the pilot signal transmitted through a fourth one of the first antenna ports may be formed by the wide beams 7' and 8'. As compared with the situation where 8 pilot signals formed by 8 wide beams are transmitted through 8 first antenna ports, in the embodiments of the present disclosure, 4 pilot signals formed by 4 resultant wide beams may be transmitted through 4 first antenna ports, i.e., it is possible to measure 64 narrow beams through 20 antenna ports, thereby further reducing the pilot resource consumption. Of course, it should be appreciated that, the pilot signals formed by the resultant beams of a plurality of wide beams may also be transmitted through one first antenna port in various ways, which will not be particularly defined herein. For example, the pilot signal transmitted through one first antenna port may be formed by the wide beams 1' and 8' having a great angle therebetween.

Certainly, it should be further appreciated that, in actual use, it is necessary to determine appropriate values of $A_N$, $A_W$, Q and M. In the case that the number of the narrow beams remain unchanged, the value of $A_N$ may decrease and the value of $A_W$ may probably increase along with an increase in the value of Q. In the case of fixed pilot signal transmission power, a gain peak value of the resultant beam of Q narrow beams may decrease, and the measurement accuracy may decrease along with a decrease in a separate degree of the narrow beams within one second antenna port. In the case that there are a remarkably large number of narrow beams, they may be supported by using a plurality of pilot progresses or in a TDD or FDD manner. Each pilot progress may include $A_W+A_N$ beam pilot ports so as to measure $A_N*Q$ narrow beams.

In a possible embodiment of the present disclosure, subsequent to the step of transmitting, by the base station, the pilot signals to the UE through the at least one first antenna port and the at least one second antenna port, the method further includes: transmitting, by the base station, the condition met by the wide beam and the narrow beams to the UE; receiving, by the base station, the identifier of the optimal narrow beam determined by the UE based on the condition met by the wide beam and the narrow beams from the UE; and using, by the base station, the identifier of the optimal narrow beam as the identifier of the optimal narrow beam corresponding to the UE.

During the implementation, the base station may transmit the condition met by the wide beam and the narrow beams to the UE. After determining the identifier of the optimal first antenna port and the identifier of the optimal second antenna port, the UE may determine the identifier of the optimal narrow beam corresponding to the UE based on the identifier of the optimal first antenna port, the identifier of the optimal second antenna port and the condition met by the wide beam and the narrow beams, and transmit the identifier of the optimal narrow beam to the base station.

It should be appreciated that, in some other embodiments of the present disclosure, in the case that the pilot signals are transmitted through the first antenna port and the second antenna port in accordance a criterion agreed by the base station and the UE, the condition met by the wide beam and the narrow beams may also be pre-stored in the UE, rather than being transmitted by the base station to the UE.

In a possible embodiment of the present disclosure, the method further includes: receiving, by the base station, a CQI from the UE; and using, by the base station, the CQI as a CQI for the optimal narrow beam corresponding to the UE.

Figure 6:
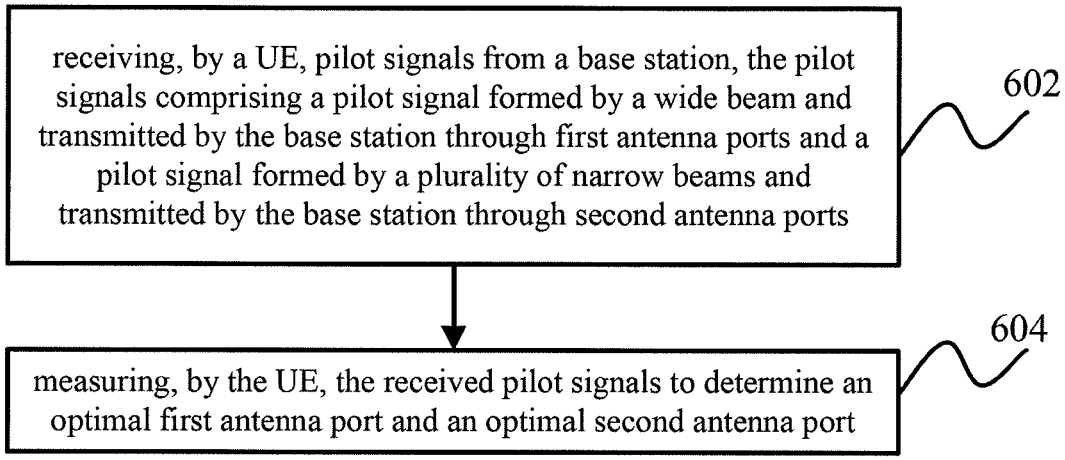
FIG. 6 is a flow chart of a method for receiving a pilot signal at a UE side according to embodiments of the present disclosure.

The present disclosure further provides in some embodiments a method for receiving a pilot signal at a UE side which, as shown in FIG. 6, includes: Step 602 of receiving, by a UE, pilot signals from a base station, the pilot signals including a pilot signal formed by a wide beam and transmitted by the base station through first antenna ports and a pilot signal formed by a plurality of narrow beams and transmitted by the base station through second antenna ports; and Step 604 of measuring, by the UE, the received pilot signals to determine an optimal first antenna port and an optimal second antenna port.

According to the method in the embodiments of the present disclosure, the UE may measure the pilot signals transmitted by the base station through the first antenna ports and the second antenna ports, and determine the optimal first antenna port and the optimal second antenna port. The pilot signal transmitted by the base station through the second antenna port may be the pilot signal formed by the plurality of narrow beams, i.e., the base station may configure one antenna port for a plurality of spatial beam directions to transmit the pilot signal. As compared with the related art where the base station configures one antenna port for each spatial beam direction to transmit the pilot signal, the pilot signals received by the UE from the base station through the second antenna port may include the pilot signal in various spatial beam directions. As a result, it is possible to reduce the number of the pilot signals received by the UE, thereby reducing the resource consumption for processing the pilot signals by the UE.

In a possible embodiment of the present disclosure, the optimal first antenna port is a first antenna port corresponding to the pilot signal with the best signal quality among the pilot signals transmitted through all the first antenna ports, and the optimal second antenna port is a second antenna port corresponding to the pilot signal with the best signal quality among the pilot signals transmitted through all the second antenna ports.

In a possible embodiment of the present disclosure, the method further includes: determining, by the UE, an identifier of the optimal first antenna port and an identifier of the optimal second antenna port based on the optimal first antenna port and the optimal second antenna port; and transmitting, by the UE, the identifier of the optimal first antenna port and the identifier of the optimal second antenna port to the base station.

In a possible embodiment of the present disclosure, the method further includes: determining, by the UE, an identifier of the optimal first antenna port and an identifier of the optimal second antenna port based on the optimal first antenna port and the optimal second antenna port; determining, by the UE, an identifier of an optimal narrow beam corresponding to the UE based on the identifier of the optimal first antenna port, the identifier of the optimal second antenna port and a condition met by the wide beam and the narrow beams, the condition met by the wide beam and the narrow beams including that the wide beam covers the narrow beams having beam direction that are at an angle below a second predetermined threshold to each other and each narrow beam is covered by at least one wide beam; and transmitting, by the UE, the identifier of the optimal narrow beam to the base station.

In a possible embodiment of the present disclosure, the step of determining, by the UE, the identifier of the optimal narrow beam corresponding to the UE based on the identifier of the optimal first antenna port, the identifier of the optimal second antenna port and the condition met by the wide beam and the narrow beams includes: determining, by the UE, a wide beam set used for forming the pilot signal transmitted through the optimal first antenna port based on the identifier of the optimal first antenna port and a first narrow beam set used for forming the pilot signal transmitted through the optimal second antenna port based on the identifier of the optimal second antenna port; determining, by the UE, the narrow beam covered by each wide beam in the wide beam set based on the condition met by the wide beam and the narrow beams, and forming a second set of narrow beaming by using the narrow beams covered by the wide beams in the wide beam set; and determining, by the UE, the narrow beam shared by the first narrow beam set and the second narrow beam set, and using an identifier of the shared narrow beam as the identifier of the optimal narrow beam corresponding to the UE.

In a possible embodiment of the present disclosure, the condition met by the wide beam and the narrow beams is pre-stored in the UE, or the condition met by the wide beam and the narrow beams is received by the UE from the base station and then stored in the UE.

In a possible embodiment of the present disclosure, the method further includes calculating, by the UE, a CQI of the pilot signal corresponding to the optimal second antenna port, and returning the CQI, as a CQI for the optimal narrow beam corresponding to the UE, to the base station.

The pilot signal transmitted through the second antenna port is a pilot signal formed by a plurality of narrow beam. In the case that the pilot signal transmitted by the base station through the optimal second antenna port includes the optimal narrow beam and the base station does not transmit the pilot signal formed merely by the optimal narrow beam, the UE may use the CQI estimated by the base station on the basis of the pilot signal transmitted through the optimal second antenna port as the CQI of the pilot signal transmitted by the base station through the optimal narrow beam.

During the implementation, the channel quality estimated by the second antenna port $a'_N$ is calculated based on an estimated equivalent channel matrix $\hat{H}^{(a'_N)}$, an estimated interference and an estimated noise power. All the pilot signals transmitted through the second antenna ports and received by the reception antennae may be measured, so as to acquire the estimated equivalent channel matrix, which may be represented on a subcarrier as $\hat{H}^{(a'_N)} = Hw^{(a'_N)} + E$, where $w^{(a'_N)} = \sum_{q=1}^{Q} w_q^{(a'_N)}$ and represents a beam-forming vector of the resultant beam of Q narrow beams, and E represents a channel estimation error matrix.

Figure 7:
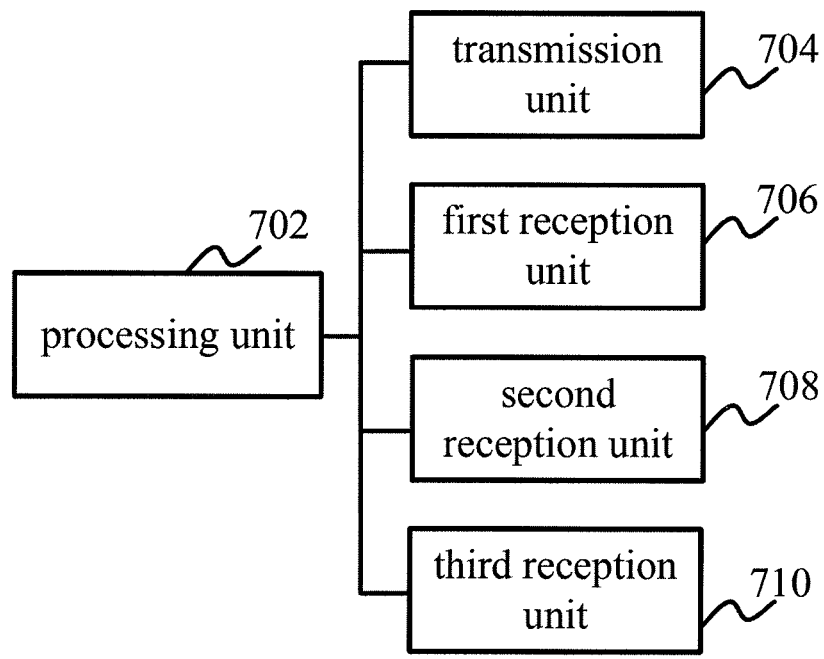
FIG. 7 is a schematic view showing a device for transmitting a pilot signal at a base station side according to embodiments of the present disclosure.

The present disclosure further provides in some embodiments a device for transmitting a pilot signal at a base station side which, as shown in FIG. 7, includes: a processing unit 702 configured to generate a pilot signal formed by a wide beam and a pilot signal formed by a plurality of narrow beams; and a transmission unit 704 connected to the processing unit 702 and configured to transmit the pilot signals to a UE through at least one pre-configured first antenna port and at least one pre-configured second antenna port. The pilot signal formed by the wide beam is transmitted through the first antenna port, and the pilot signal formed by the plurality of narrow beams is transmitted through the second antenna port.

According to the device in the embodiments of the present disclosure, the device may transmit the pilot signals through the at least one pre-configured first antenna port and the at least one pre-configured second antenna port, and the pilot signal transmitted through the second antenna port may be the pilot signal formed by the plurality of narrow beams, i.e., the device may configure one antenna port for a plurality of spatial beam directions to transmit the pilot signal. As compared with the related art where the base station configures one antenna port for each spatial beam direction to transmit the pilot signal, it is able for one antenna port to transmit the pilot signal formed by the plurality of narrow beams in a plurality of beam directions. As a result, it is possible to reduce the number of the antenna ports for transmitting the pilot signals, thereby reducing the pilot resource consumption.

In a possible embodiment of the present disclosure, the wide beam and the narrow beams meet a condition that the wide beam covers the narrow beams having beam direction that are at an angle below a second predetermined threshold to each other and each narrow beam is covered by at least one wide beam.

In a possible embodiment of the present disclosure, the pilot signal formed by the wide beam is a pilot signal formed by a resultant beam of a plurality of wide beams, and the pilot signals formed by the narrow beams covered by different wide beams of the plurality of wide beams are transmitted through different second antenna ports.

According to the device in the embodiments of the present disclosure, the pilot signal formed by the wide beam is the pilot signal formed by the resultant beam of the plurality of wide beams, and as compared with the situation where the pilot signal formed by each wide beam is transmitted through one of the first antenna ports, it is possible to further reduce the number of the first antenna ports, thereby reducing the pilot resource consumption.

In a possible embodiment of the present disclosure, the device further includes: a first reception unit 706 connected to the processing unit 702 and configured to receive an identifier of an optimal first antenna port and an identifier of an optimal second antenna port from the UE after the transmission unit 704 transmits the pilot signals to the UE through the at least one pre-configured first antenna port and the at least one pre-configured second antenna port. The optimal first antenna port is a first antenna port corresponding to a pilot signal with the best signal quality among the pilot signals received by the UE from all the first antenna ports, and the optimal second antenna port is a second antenna port corresponding to a pilot signal with the best signal quality among the pilot signals received by the UE from all the second antenna ports. The processing unit 702 is further configured to determine an identifier of an optimal narrow beam corresponding to the UE based on the identifier of the optimal first antenna port, the identifier of the optimal second antenna port and the condition met by the wide beam and the narrow beams.

In a possible embodiment of the present disclosure, the processing unit 702 is further configured to: determine a wide beam set used for forming the pilot signal transmitted by the optimal first antenna port based on the identifier of the optimal first antenna port and a first narrow beam set used for forming the pilot signal transmitted by the optimal second antenna port based on the identifier of the optimal second antenna port; determine the narrow beam covered by each wide beam in the wide beam set based on the condition met by the wide beam and the narrow beams, and form a second narrow beam set including the narrow beams covered by the wide beams in the wide beam set; and determine the narrow beam shared by the first narrow beam set and the second narrow beam set, and use the identifier of the narrow beam as the identifier of the optimal narrow beam corresponding to the UE.

In a possible embodiment of the present disclosure, the transmission unit 704 is further configured to transmit the condition met by the wide beam and the narrow beams to the UE. The device further includes a second reception unit 708 connected to the processing unit 702 and configured to, after the transmission unit 704 transmits the pilot signals to the UE through the at least one first antenna port and the at least one second antenna port, receive the identifier of the optimal narrow beam determined by the UE based on the condition met by the wide beam and the narrow beams from the UE. The processing unit 702 is further configured to use the identifier of the optimal narrow beam as the identifier of the optimal narrow beam corresponding to the UE.

In a possible embodiment of the present disclosure, the device further includes a third reception unit 710 connected to the processing unit 702 and configured to receive a CQI from the UE. The processing unit 702 is further configured to use the CQI as a CQI for the optimal narrow beam corresponding to the UE.

The device for transmitting the pilot signal in the embodiments of the present disclosure may be a base station, a part of the base station integrated into a conventional base station device. The processing unit 702 may be a Central Processing Unit (CPU) and the like. The transmission unit 704 may be a transmitter or a signal emitter. The first reception unit 706, the second reception unit 708 and the third reception unit 710 may be an identical receiver or signal receiver, and of course, three different receivers or signal receivers may also be used.

Figure 8:
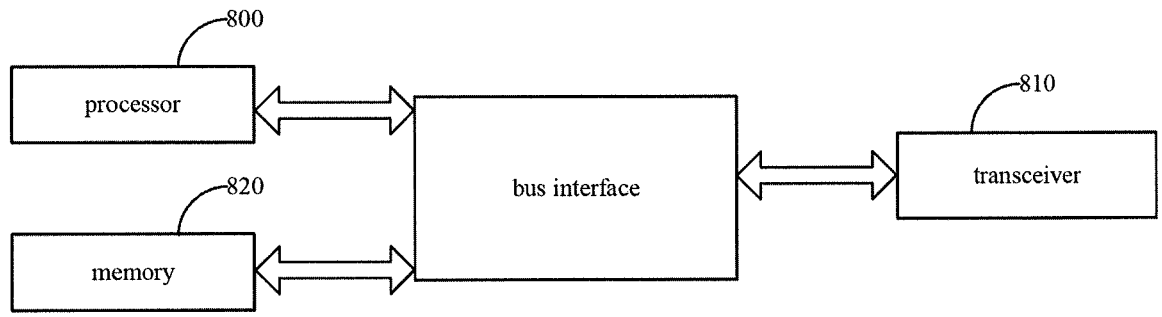
FIG. 8 is another schematic view showing the device for transmitting the pilot signal at the base station side according to embodiments of the present disclosure.

The present disclosure further provides in some embodiments a device for transmitting a pilot signal which, as shown in FIG. 8, includes a processor 800, a transceiver 810 and a memory 820. The processor 800 is configured to read a program stored in the memory 820, to perform the following operations: generating a pilot signal formed by a wide beam and a pilot signal formed by a plurality of narrow beams; transmitting through the transceiver 810 the pilot signals to a UE through at least one pre-configured first antenna port and at least one pre-configured second antenna port, the pilot signal transmitted through the first antenna port being the pilot signal formed by the wide beam, and the pilot signal transmitted through the second antenna port being the pilot signal formed by the plurality of narrow beams; receiving through the transceiver 810 an identifier of an optimal first antenna port and an identifier of an optimal second antenna port from the UE; and determining an identifier of an optimal narrow beam corresponding to the UE based on the identifier of the optimal first antenna port, the identifier of the optimal second antenna port and a condition met by the wide beam and the narrow beams. The transceiver 810 is configured to receive and transmit data under the control of the processor 800.

In FIG. 8, a bus architecture may include a number of buses and bridges connected to each other, so as to connect various circuits for one or more processors 800 and one or more memories 820. In addition, as known in the art, the bus architecture may be used to connect any other circuits, such as a circuit for a peripheral device, a circuit for a voltage stabilizer and a power management circuit. Bus interfaces are provided, and the transceiver 810 may consist of a plurality of elements, i.e., a transmitter and a receiver for communication with any other devices over a transmission medium. The processor 800 may take charge of managing the bus architecture as well as general processing. The memory 820 may store data desired for the operation of the processor 900.

Figure 9:
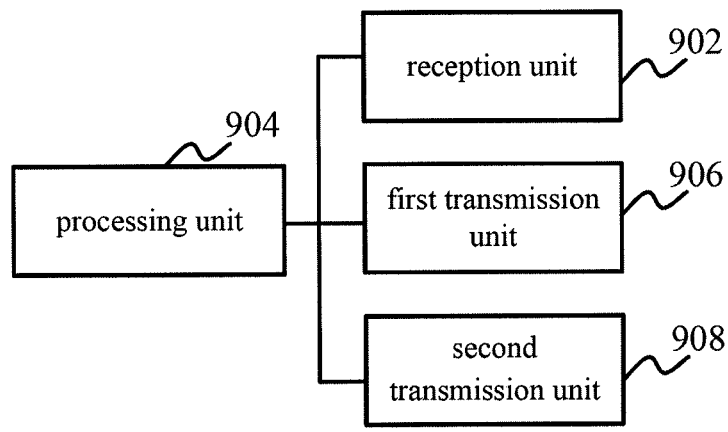
FIG. 9 is a schematic view showing a device for receiving a pilot signal at a UE side according to embodiments of the present disclosure.

The present disclosure further provides in some embodiments a device for receiving a pilot signal at a UE side which, as shown in FIG. 9, includes: a reception unit 902 configured to receive pilot signals from a base station, the pilot signals including a pilot signal formed by a wide beam and transmitted by the base station through first antenna ports and a pilot signal formed by a plurality of narrow beams and transmitted by the base station through second antenna ports; and a processing unit 904 connected to the reception unit 902 and configured to measure the received pilot signals so as to determine an optimal first antenna port and an optimal second antenna port.

According to the device in the embodiments of the present disclosure, the device may measure the pilot signals transmitted by the base station through the first antenna port and the second antenna port, and determine the optimal first antenna port and the optimal second antenna port. The pilot signal transmitted by the base station through the second antenna port may be the pilot signal formed by the plurality of narrow beams, i.e., the base station may configure one antenna port for a plurality of spatial beam directions to transmit the pilot signal. As compared with the related art where the base station configures one antenna port for each spatial beam direction to transmit the pilot signal, the pilot signals received by the device from the base station through the second antenna port may include the pilot signal in various spatial beam directions. As a result, it is possible to reduce the number of the pilot signals received by the UE, thereby reducing the resource consumption for processing the pilot signals by the UE.

In a possible embodiment of the present disclosure, the processing unit 904 is further configured to determine an identifier of the optimal first antenna port and an identifier of the optimal second antenna port based on the optimal first antenna port and the optimal second antenna port. The device further includes a first transmission unit 906 connected to the processing unit 904 and configured to transmit the identifier of the optimal first antenna port and the identifier of the optimal second antenna port to the base station.

In a possible embodiment of the present disclosure, the processing unit 904 is further configured to: determine an identifier of the optimal first antenna port and an identifier of the optimal second antenna port based on the optimal first antenna port and the optimal second antenna port; and determine an identifier of an optimal narrow beam corresponding to the UE based on the identifier of the optimal first antenna port, the identifier of the optimal second antenna port and a condition met by the wide beam and the narrow beams, the condition met by the wide beam and the narrow beam including that the wide beam covers the narrow beams having beam direction that are at an angle below a second predetermined threshold to each other and each narrow beam is covered by at least one wide beam. The device further includes a second transmission unit 908 connected to the processing unit 904 and configured to transmit the identifier of the optimal narrow beam to the base station.

In a possible embodiment of the present disclosure, the processing unit 904 is further configured to: determine a wide beam set used for forming the pilot signal transmitted through the optimal first antenna port based on the identifier of the optimal first antenna port and a first narrow beam set used for forming the pilot signal transmitted through the optimal second antenna port based on the identifier of the optimal second antenna port; determine the narrow beam covered by each wide beam in the wide beam set based on the condition met by the wide beam and the narrow beams, and form a second set of narrow beaming by using the narrow beams each covered by the wide beam in the wide beam set; and determine the narrow beam shared by the first narrow beam set and the second narrow beam set, and use an identifier of the narrow beam as the identifier of the optimal narrow beam corresponding to the UE.

In a possible embodiment of the present disclosure, the processing unit 904 is further configured to calculate a CQI of the pilot signal corresponding to the optimal second antenna port, and return the CQI, as a CQI for the optimal narrow beam corresponding to the UE, to the base station.

The device for receiving the pilot signal in the embodiments of the present disclosure may be the UE integrated into a conventional UE. The processing unit 904 may employ a CPU. The reception unit 902 may be a receiver or signal receiver. The first transmission unit 906 and the second transmission unit 908 may be an identical transmitter or signal emitter, and of course, two different transmitters or signal emitters may also be used.

Figure 10:
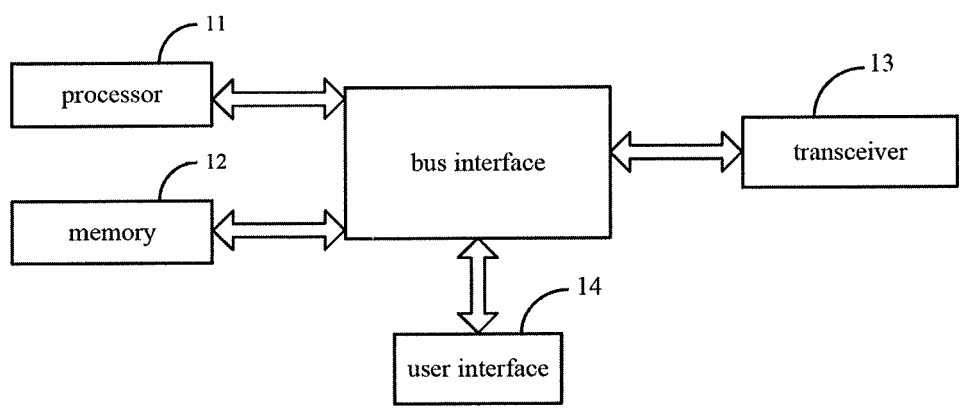
FIG. 10 is another schematic view showing the device for receiving the pilot signal at the UE side according to embodiments of the present disclosure.

The present disclosure further provides in some embodiments a device for receiving a pilot signal which, as shown in FIG. 10, includes a processor 11, a memory 12, a transceiver 13 and a user interface 14. The processor 11 is configured to read a program stored in the memory 12, to perform the following operations: receiving through the transceiver 13 pilot signals from a base station, the pilot signals including a pilot signal formed by a wide beam and transmitted by the base station through a first antenna port and a pilot signal formed by a plurality of narrow beams and transmitted by the base station through a second antenna port; measuring the received pilot signals to determine an optimal first antenna port and an optimal second antenna port; determining an identifier of the optimal first antenna port and an identifier of the optimal second antenna port based on the optimal first antenna port and the optimal second antenna port; and transmitting through the transceiver 13 the identifier of the optimal first antenna port and the identifier of the optimal second antenna port to the base station. The processor 11 is further configured to: determine an identifier of the optimal first antenna port and an identifier of the optimal second antenna port based on the optimal first antenna port and the optimal second antenna port; determine an identifier of an optimal narrow beam corresponding to the UE based on the identifier of the optimal first antenna port, the identifier of the optimal second antenna port and a condition met by the wide beam and the narrow beams, the condition met by the wide beam and the narrow beam including that the wide beam covers the narrow beams having beam direction that are at an angle below a second predetermined threshold to each other and each narrow beam is covered by at least one wide beam; and transmit through the transceiver 13 the identifier of the optimal narrow beam to the base station. The transceiver 13 is configured to receive and transmit data under the control of the processor 11.

In FIG. 10, the bus architecture may include any number of buses and bridges connected to each other, so as to connect various circuits for one or more processors 11 and one or more memories 12. In addition, as known in the art, the bus architecture may be used to connect any other circuits, such as a circuit for a peripheral device, a circuit for a voltage stabilizer and a power management circuit, which will not be further described in the present disclosure. Bus interfaces are provided, and the transceiver 13 may consist of a plurality of elements, i.e., a transmitter and a receiver for communication with any other devices over a transmission medium. With respect to different UEs, a user interface 14 may also be provided for devices which are to be arranged inside or outside the UE, and these devices may include but not limited to a keypad, a display, a speaker, a microphone and a joystick, etc.

The processor 11 may take charge of managing the bus architecture as well as general processings. The memory 12 may store therein data for the operation of the processor 11.

According to the methods and devices for transmitting and receiving the pilot signal in the embodiments of the present disclosure, the base station may transmit the pilot signals through the at least one pre-configured first antenna port and the at least one pre-configured second antenna port, and the pilot signal transmitted through the second antenna port may be the pilot signal formed by the plurality of narrow beams, i.e., the base station may configure one antenna port for a plurality of spatial beam directions to transmit the pilot signal. As a result, it is possible for one antenna port to transmit the pilot signal formed by the plurality of narrow beams in a plurality of beam directions, thereby reducing the number of the antenna ports for transmitting the pilot signals and reducing the pilot resource consumption.

It should be appreciated that, the present disclosure may be provided as a method, a system or a computer program product, so the present disclosure may adopt a complete hardware embodiment and a complete software embodiment, or in the form of an embodiment combining software and hardware. In addition, the present disclosure may be in the form of a computer program product implemented on one or more computer-readable storage mediums (including but not limited to a disk memory and an optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a general purpose computer, a special purpose computer, an embedded processor or any other programmable data processing devices to create a machine, so that instructions executable by the processor of the computer or other programmable data processing devices may create a device to achieve the functions assigned in one or more work flows in the flow chart and/or one or more blocks in the block diagram.

These computer program instructions may also be stored in a computer readable storage that may guide the computer or other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Certainly, a person skilled in the art may make further modifications and variations without departing from the spirit and scope of the present disclosure. The disclosure is intended to embrace all such modifications and variations that fall within the scope of the appended claims of the present disclosure and their equivalents.

What is claimed is:

1. A method for transmitting a pilot signal, comprising:
generating, by a base station, a pilot signal formed by a wide beam and a pilot signal formed by a plurality of narrow beams; and
transmitting, by the base station, the pilot signals to a User Equipment (UE) through at least one pre-configured first antenna port and at least one pre-configured second antenna port, the pilot signal formed by the wide beam being transmitted through the at least one pre-configured first antenna port, and the pilot signal formed by the plurality of narrow beams being transmitted through the at least one pre-configured second antenna port;
wherein the pilot signal formed by the plurality of narrow beams includes:
a pilot signal formed by a plurality of narrow beams that are simultaneously transmitted through the at least one pre-configured second antenna port;
wherein the pilot signal formed by the plurality of narrow beams comprises:
a pilot signal formed by a resultant beam of a plurality of narrow beams, beam directions of the plurality of narrow beams are orthogonal to each other, or
a pilot signal formed by a resultant beam of a plurality of narrow beams, beam directions of the plurality of narrow beams are at an angle above a first predetermined threshold to each other,
the wide beam and the narrow beams meet a condition that the wide beam covers the narrow beams having beam directions that are at an angle below a second predetermined threshold to each other and each of the plurality of narrow beams is covered by at least one wide beam, and
the pilot signal formed by the wide beam is a pilot signal formed by a resultant beam of a plurality of wide beams, and the pilot signals formed by the narrow beams covered by different wide beams of the plurality of wide beams are transmitted through different second antenna ports.

2. The method according to claim 1, further comprising, subsequent to the step of transmitting, by the base station, the pilot signals to the UE through the at least one pre-configured first antenna port and the at least one pre-configured second antenna port:
receiving, by the base station, an identifier of an optimal first antenna port and an identifier of an optimal second antenna port from the UE, the optimal first antenna port being a first antenna port corresponding to a pilot signal with a best signal quality among the pilot signals received by the UE from the at least one first antenna port, the optimal second antenna port being a second antenna port corresponding to a pilot signal with a best signal quality among the pilot signals received by the UE from the at least one second antenna port; and
determining, by the base station, an identifier of an optimal narrow beam corresponding to the UE based on the identifier of the optimal first antenna port, the identifier of the optimal second antenna port and the condition met by the wide beam and the narrow beams.

3. The method according to claim 2, wherein the step of determining, by the base station, the identifier of the optimal narrow beam corresponding to the UE based on the identifier of the optimal first antenna port, the identifier of the optimal second antenna port and the condition met by the wide beam and the narrow beams comprises:
determining, by the base station, a wide beam set used for forming the pilot signal transmitted by the optimal first antenna port based on the identifier of the optimal first antenna port and a first narrow beam set used for forming the pilot signal transmitted by the optimal second antenna port based on the identifier of the optimal second antenna port;
determining, by the base station, the narrow beam covered by each wide beam in the wide beam set based on the condition met by the wide beam and the narrow beams, and forming a second narrow beam set by using the narrow beams covered by the wide beams in the wide beam set; and
determining, by the base station, a narrow beam shared by the first narrow beam set and the second narrow beam set, and using an identifier of the shared narrow beam as the identifier of the optimal narrow beam corresponding to the UE.

4. The method according to claim 3, further comprising:
receiving, by the base station, a Channel Quality Indicator (CQI) from the UE; and
using, by the base station, the CQI as a CQI for the optimal narrow beam corresponding to the UE.

5. The method according to claim 1, further comprising, subsequent to the step of transmitting, by the base station, the pilot signals to the UE through the at least one pre-configured first antenna port and the at least one pre-configured second antenna port:
transmitting, by the base station, the condition met by the wide beam and the narrow beams to the UE;
receiving, by the base station, an identifier of the optimal narrow beam determined by the UE based on the condition met by the wide beam and the narrow beams from the UE; and
using, by the base station, the identifier of the optimal narrow beam as the identifier of the optimal narrow beam corresponding to the UE.

6. A method for receiving a pilot signal, comprising:
receiving, by a User Equipment (UE), pilot signals from a base station, the pilot signals comprising a pilot signal formed by a wide beam and transmitted by the base station through first antenna ports and a pilot signal formed by a plurality of narrow beams and transmitted by the base station through a second antenna port, wherein the pilot signal formed by the plurality of narrow beams includes: a pilot signal formed by a plurality of narrow beams that are simultaneously transmitted through the second antenna port; and measuring, by the UE, the received pilot signals to determine an optimal first antenna port and an optimal second antenna port;

wherein the method further includes:

determining, by the UE, an identifier of the optimal first antenna port and an identifier of the optimal second antenna port based on the optimal first antenna port and the optimal second antenna port;

determining, by the UE, an identifier of an optimal narrow beam corresponding to the UE based on the identifier of the optimal first antenna port, the identifier of the optimal second antenna port and a condition met by the wide beam and the narrow beams, the condition met by the wide beam and the narrow beams comprising that the wide beam covers narrow beams having beam directions that are at an angle below a predetermined threshold to each other and each of the plurality of narrow beams is covered by at least one wide beam; and transmitting, by the UE, the identifier of the optimal narrow beam to the base station.

7. The method according to claim 6, wherein the optimal first antenna port is a first antenna port corresponding to the pilot signal with a best signal quality among the pilot signals transmitted through the first antenna ports, and the optimal second antenna port is a second antenna port corresponding to the pilot signal with a best signal quality among the pilot signals transmitted through the second antenna ports.

8. The method according to claim 6, wherein the step of determining, by the UE, the identifier of the optimal narrow beam corresponding to the UE based on the identifier of the optimal first antenna port, the identifier of the optimal second antenna port and the condition met by the wide beam and the narrow beams comprises:

determining, by the UE, a wide beam set used for forming the pilot signal transmitted through the optimal first antenna port based on the identifier of the optimal first antenna port and a first narrow beam set used for forming the pilot signal transmitted through the optimal second antenna port based on the identifier of the optimal second antenna port;

determining, by the UE, the narrow beam covered by each wide beam in the wide beam set based on the condition met by the wide beam and the narrow beams, and forming a second narrow beam set by using the narrow beams covered by the wide beams in the wide beam set; and determining, by the UE, a narrow beam shared by the first narrow beam set and the second narrow beam set, and using an identifier of the shared narrow beam as the identifier of the optimal narrow beam corresponding to the UE.

9. A device for transmitting a pilot signal, comprising:

a processing unit configured to generate a pilot signal formed by a wide beam and a pilot signal formed by a plurality of narrow beams; and a transmission unit connected to the processing unit and configured to transmit the pilot signals to a User Equipment (UE) through at least one pre-configured first antenna port and at least one pre-configured second antenna port, the pilot signal formed by the wide beam being transmitted through the at least one pre-configured first antenna port, and the pilot signal formed by the plurality of narrow beams being transmitted through the at least one pre-configured second antenna port; wherein the pilot signal formed by the plurality of narrow beams includes: a pilot signal formed by a plurality of narrow beams that are simultaneously transmitted through the second antenna port;

wherein the wide beam and the narrow beams meet a condition that the wide beam covers the narrow beams having beam directions that are at an angle below a predetermined threshold to each other and each of the plurality of narrow beams is covered by at least one wide beam;

wherein the device further includes a first reception unit connected to the processing unit and configured to receive an identifier of an optimal first antenna port and an identifier of an optimal second antenna port from the UE after the transmission unit transmits the pilot signals to the UE through the at least one pre-configured first antenna port and the at least one pre-configured second antenna port, the optimal first antenna port being a first antenna port corresponding to a pilot signal with a best signal quality among the pilot signals received by the UE from all the first antenna ports, the optimal second antenna port being a second antenna port corresponding to a pilot signal with a best signal quality among the pilot signals received by the UE from all the second antenna ports, wherein the processing unit is further configured to determine an identifier of an optimal narrow beam corresponding to the UE based on the identifier of the optimal first antenna port, the identifier of the optimal second antenna port and the condition met by the wide beam and the narrow beams.

10. The device according to claim 9, wherein the processing unit is further configured to:

determine a wide beam set used for forming the pilot signal transmitted by the optimal first antenna port based on the identifier of the optimal first antenna port and a first narrow beam set used for forming the pilot signal transmitted by the optimal second antenna port based on the identifier of the optimal second antenna port;

determine the narrow beam covered by each wide beam in the wide beam set based on the condition met by the wide beam and the narrow beams, and form a second narrow beam set by using the narrow beams covered by the wide beams in the wide beam set; and determine a narrow beam shared by the first narrow beam set and the second narrow beam set, and use an identifier of the shared narrow beam as the identifier of the optimal narrow beam corresponding to the UE.

11. A device for receiving a pilot signal, comprising:

a reception unit configured to receive pilot signals from a base station, the pilot signals comprising a pilot signal formed by a wide beam and transmitted by the base station through first antenna ports and a pilot signal formed by a plurality of narrow beams and transmitted by the base station through a second antenna port, wherein the pilot signal formed by the plurality of narrow beams includes: a pilot signal formed by a plurality of narrow beams that are simultaneously transmitted through the second antenna port; and a processing unit connected to the reception unit and configured to measure the received pilot signals to determine an optimal first antenna port and an optimal second antenna port;

wherein the processing unit is further configured to determine an identifier of the optimal first antenna port and an identifier of the optimal second antenna port based on the optimal first antenna port and the optimal second antenna port, and determine an identifier of an optimal narrow beam corresponding to the UE based on the identifier of the optimal first antenna port, the identifier of the optimal second antenna port and a condition met by the wide beam and the narrow beams, the condition met by the wide beam and the narrow beams comprising that the wide beam covers narrow beams having beam directions that are at an angle below a predetermined threshold to each other and each of the plurality of narrow beams is covered by at least one wide beam; and the device further comprises a transmission unit connected to the processing unit and configured to transmit the identifier of the optimal narrow beam to the base station.

12. The device according to claim 11, wherein the processing unit is further configured to:

determine a wide beam set used for forming the pilot signal transmitted through the optimal first antenna port based on the identifier of the optimal first antenna port and a first narrow beam set used for forming the pilot signal transmitted through the optimal second antenna port based on the identifier of the optimal second antenna port;

determine the narrow beam covered by each wide beam in the wide beam set based on the condition met by the wide beam and the narrow beams, and form a second narrow beam set by using the narrow beams covered by the wide beams in the wide beam set; and determine a narrow beam shared by the first narrow beam set and the second narrow beam set, and use an identifier of the shared narrow beam as the identifier of the optimal narrow beam corresponding to the UE.

* * * * *